US012666193B2

(12) United States Patent
Milne et al.

(10) Patent No.: US 12,666,193 B2
(45) Date of Patent: Jun. 23, 2026

(54) PREDICTIVE SOUND CONTROL OF VENTS FOR A HEARABLE DEVICE

(71) Applicant: Sony Group Corporation, Tokyo (JP)

(72) Inventors: James R. Milne, Ramona, CA (US);
Brant L. Canderlore, Poway, CA (US);
Justin Kenefick, San Diego, CA (US);
William Clay, San Diego, CA (US)

(73) Assignee: SONY GROUP CORPORATION,
Tokyo (JP)

( * ) Notice: Subject to any disclaimer, the term of this patent is extended or adjusted under 35 U.S.C. 154(b) by 171 days.

(21) Appl. No.: 18/773,372

(22) Filed: Jul. 15, 2024

(65) Prior Publication Data

US 2026/0019736 A1      Jan. 15, 2026

(51) Int. Cl.
H04R 1/10 (2026.01)
G06V 10/70 (2022.01)
G06V 20/50 (2022.01)

(52) U.S. Cl.
CPC ........... H04R 1/1083 (2013.01); G06V 10/70 (2022.01); G06V 20/50 (2022.01); H04R 2460/11 (2013.01)

(58) Field of Classification Search
CPC ............... H04R 1/1041; H04R 1/1083; H04R 2430/01; H04R 2460/11; G06V 10/70; G06V 20/50
See application file for complete search history.

(56) References Cited

U.S. PATENT DOCUMENTS

| | | | |
|---|---|---|---|
| 8,923,543 B2 | 12/2014 | Sacha et al. | |
| 10,687,153 B2 | 6/2020 | Albahri et al. | |
| 2014/0169579 A1* | 6/2014 | Azmi ................... | H04R 1/1083 381/71.6 |
| 2019/0259378 A1 | 8/2019 | Krishna | |
| 2020/0260197 A1* | 8/2020 | Thomsen ............... | H04R 25/48 |
| 2022/0167099 A1 | 5/2022 | Feilner | |
| 2022/0240031 A1* | 7/2022 | Naumann ............ | H04R 1/1041 |
| 2022/0360881 A1* | 11/2022 | Merca .................. | H04R 1/1041 |
| 2022/0377467 A1 | 11/2022 | Wexler | |
| 2023/0292059 A1 | 9/2023 | Candelore | |
| 2023/0329913 A1 | 10/2023 | Qi | |
| 2023/0386443 A1 | 11/2023 | Bean | |
| 2023/0403495 A1* | 12/2023 | Kusui .................. | H04R 1/1041 |

FOREIGN PATENT DOCUMENTS

EP          4064723 A1      9/2022

* cited by examiner

*Primary Examiner* — Jason R Kurr
(74) *Attorney, Agent, or Firm* — Trellis IP Law Group, PC

(57)          ABSTRACT
A hearable vent control system is provided to enable vents in hearable devices to automatically be at least partially closed in response to the system predicting a potential for a loud sound to occur above a threshold volume in the environment. An image capture device is utilized to produce images of the environment. The images are analyzed to detect visual sound factors that indicate a potential loud sound, such as sound reflective elements, reoccurring loud sound sources, etc. The system uses the visual sound factors to predict a volume above a threshold and at least partially closes vents in response.

20 Claims, 8 Drawing Sheets

200

200

300

600

Receive environment image(s) from image capture device
602

Analyze image(s) for visual sound factor
604

Detect visual sound factor in the image
606

Determining potential loud sound by predicting factor meets loudness threshold
608

At least partially close vent(s)
610

Detect occurrence of loud sound
612

Has loud sound ceased?
614

No

Yes

Return vents to prior open position
616

700

800

PREDICTIVE SOUND CONTROL OF VENTS FOR A HEARABLE DEVICE

BACKGROUND

Hearable devices can use vents to let a user hear ambient sounds and allow the movement of air in and out of the hearable device. Vents can be opened and closed for various listening effects, such as closing the vents to improve low frequency sounds played through speakers of the hearable device. Open vents can allow sounds to be naturally heard by a user so there is a diminished feeling of being plugged. Active vents include hardware components that require mechanical closure including actuation of vent valves.

Hearable devices (also called "hearables" or "auditory devices") include a variety of ear worn devices to alter the hearing of the user, such as playing audio close to or into the ear (e.g., headphones, earbuds), impeding the hearing of environmental audio (e.g., noise canceling), assisting with hearing of environmental audio (e.g., hearing aids), etc. Hearable devices can protect hearing by blocking loud environmental sounds from injuring the ears. Passive noise cancelling techniques block all sound from entering the ears. However, there are often times in which environmental sounds may be important or desirable to be heard while using hearable devices.

Hearable devices that use active noise cancellation to protect ears from environmental sounds capture environmental noises and generate an inverse to cancel the captured noises. These devices work in real time as the noise is occurring.

SUMMARY

A hearable vent control system (also called "communication system" or "system") is provided that automatic closing of vents in hearable devices in response to the system predicting the future occurrence of a loud environmental sound above a threshold volume. Often, the potential loud sound is imminent, based on various visual factors found in images in the environment. Additional situational factors may also be considered in making the prediction.

A hearable vent control method is provided that is implemented by one or more computers in which at least one image of an environment of a user is received from an image capture device of the user. The at least one image is analyzed to detect at least one visual sound factor indicative of a potential loud sound. Based, at least in part, on detecting the at least one visual sound factor, the vent control system predicts that the potential loud sound in the environment satisfies a threshold volume. In response, at least in part, to predicting the potential loud sound satisfies the threshold volume, one or more vents of the hearable device are at least partially closed by the system.

In some aspects of the method, a common sound artificial intelligence (AI) model is used to predict the at least one visual sound factor satisfies the threshold volume. The common sound AI model may be trained on loud sound datasets that include common visual features associated with loud sounds including the potential loud sound. The image(s) may be inputted into the common sound AI model. An output may be received from the common sound AI model that includes a prediction that the at least one visual sound factor is present and the at least one visual sound factor is predicted to satisfy the threshold volume to identify the potential loud sound.

In some implementations, an enclosed space AI model may be employed, which is trained on sound reflective elements. At least one of the captured image(s) is inputted into the enclosed space AI model. The output from the AI model that is received may include a prediction that the at least one visual sound factor satisfies the threshold volume to identify a potential loud sound. This prediction may be based on the enclosed space AI model performing predictive steps. Such steps may include determining that the environment of the user is an enclosed space and detecting of a high reflectance characteristic of the environment sufficient to cause the potential loud sound to satisfy the threshold volume.

The closure of hearable device vents may also employ sound test factors. For example, in some implementations, a sample sound may be emitted into an enclosed space environment. The sample sound may then be detected and analyzed to determine a high reflectance characteristic of the environment.

In some cases, the visual sound factor(s) may include a sound source that is identified by analyzing the image(s). An estimate proximity of a sound source from the user may also be determined and whether the estimate proximity meets a threshold loudness distance.

In some implementations, the method may include determining an estimate sound volume of the potential loud sound. Based, at least in part, on the estimate sound level, a first vent may be allowed to remain open, allowing unobstructed air passage, whereas a second vent may be closed, to prevent air passage. In still some implementations, based, at least in part, on the estimate sound level, at least one vent may be partially closed to allow a reduced passage of air.

In another aspect of the method at least one object may be identified in the at least one image. The object may be matched with a stored object in a library of common sources of the loud sounds.

In some implementations, a hearable vent control system is provided, which includes an image capture device and a hearable device. The image capture device is used to capture at least one image of the environment of a user and has an interface to transmit the image(s) to the hearable device. The hearable device includes one or more processors and logic encoded in one or more non-transitory media for execution by the one or more processors. When the logic is executed, the logic is operable to perform various operations as described above in terms of the method. The operations include at least some of the methods described above.

In some implementations, a non-transitory computer-readable storage medium is provided which carries program instructions for vent control of a hearable device. These instructions when executed by one or more processors cause the one or more processors to perform operations as described above for the hearable vent control method described above.

A further understanding of the nature and the advantages of particular embodiments disclosed herein may be realized by reference of the remaining portions of the specification and the attached drawings.

BRIEF DESCRIPTION OF THE DRAWINGS

The disclosure is illustrated by way of example, and not by way of limitation in the figures in which like reference numerals are used to refer to similar elements.

DETAILED DESCRIPTION OF EMBODIMENTS

Figure 1:
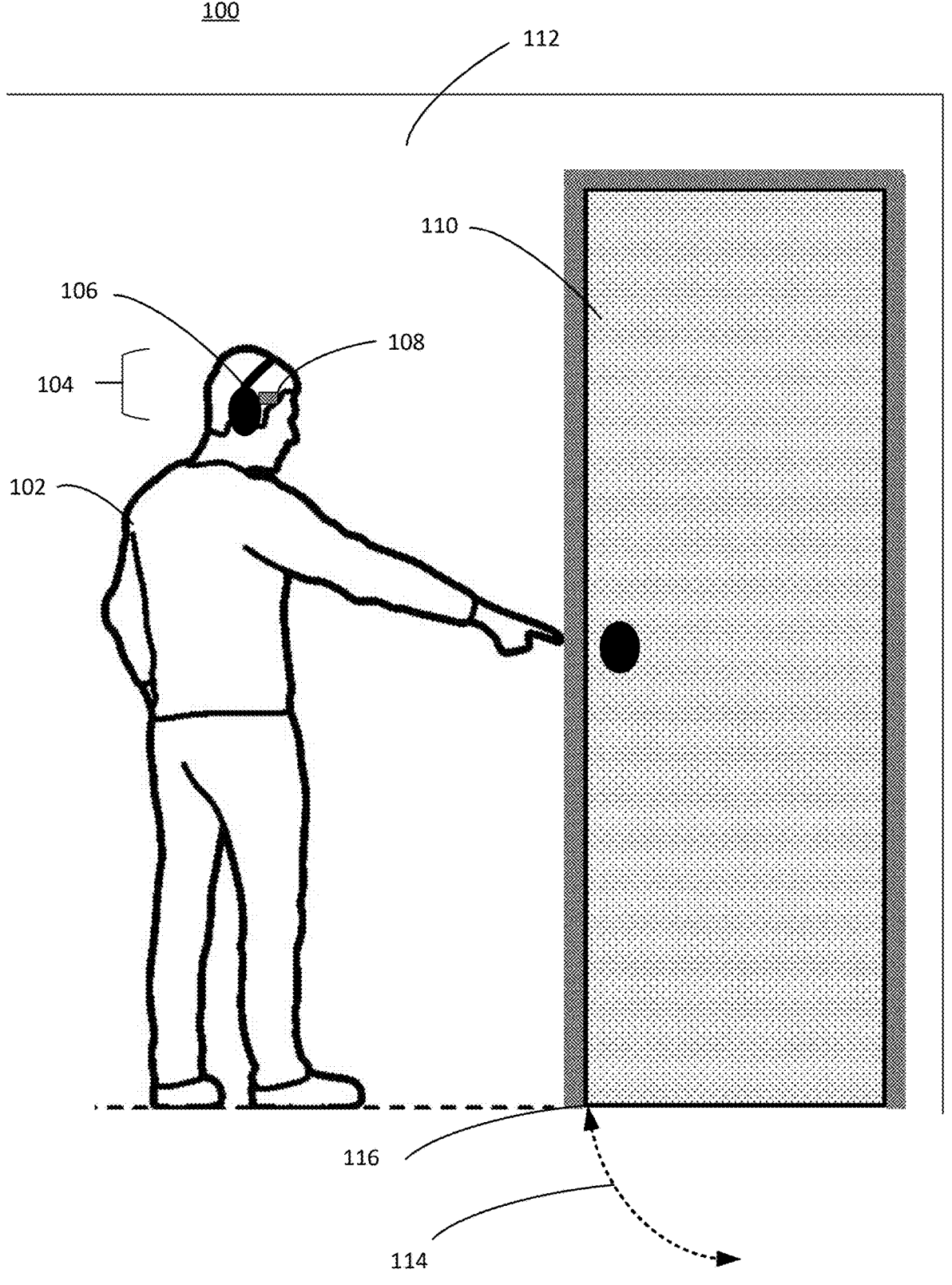
FIG. 1 is a conceptual diagram illustrating a plan view of an example setting in which some aspects of the hearable vent control system can be implemented, in accordance with some implementations.

The present hearable vent control system enables vents in hearable devices to be at least partially closed automatically in response to the system predicting a loud environmental sound to occur above a threshold volume in the environment. An image capture device is utilized to produce images of the environment. The images are analyzed to detect visual sound factors that indicate the potential loud sound, such as sound reverberance elements, sources of reoccurring sounds, user actions, location, etc. The system uses the visual sound factors, and at times additional situational factors detected by other devices/sensors to predict a perceived volume above a threshold and at least partially closes vents in response.

In some implementations, additional situational factors may be regarded, such as an estimated proximity of a potential sound source to the user, location of the user, actions of the user, etc. Nearness of the potential sound source may increase the probability that a potential loud sound will satisfy the threshold volume. It may be determined whether the estimate proximity of a sound source meets a threshold loudness distance.

In still some implementations, the vent control system may use negative factors that negate a finding of a potential loud sound above a threshold volume. A negative factors may include a location that cancels a finding that a typical loud sound source will likely produce a loud sound. For example, a possible loud sound source of an airplane may be detected to be in a museum and not operational. As such, the airplane would be ignored as a potential loud sound source by the vent control system.

Reverberation of sound in an enclosed space may also increase the perceived volume of the sounds above the threshold volume. In some cases, a combination of reflective and absorbent materials in an environment may be considered in combination to determine a resulting reverberation of sound. An estimated area of the enclosed space may further impact perceived volume of a sound.

One or more AI models may be employed in predicting the potential loud sound. In some implementations, a common source AI model may be trained on factors that indicate reoccurring loud sounds for a particular or common to users in general. For example, identification of a loud sound source in images of a current user environment may indicate an imminent loud sound is about to occur. In some implementations, an enclosed space AI model may be trained on visual features of an enclosed space that are known to effect sound reverberance, e.g., materials accentuating reverberance by having high reflectance characteristics, materials that reduce reverberance by having high sound absorption characteristics, estimated area of a space, etc. High reflective characteristics of an element may be measured by various known methods. For example, a sound absorption coefficient of less 0.1 or less may be considered highly reflective material for a particular frequency of sound.

The AI models may extract visual sound factors in the visual content of the images and possibly situational factors interpreted from the environment. Combinations of various sound factors may provide rich datasets to predict loud sounds and sound volumes. Sound factors may be coupled to increase predictability of imminent sounds, such as detecting a hammer in environment images, as well as a nail may indicate that the hammer combined with the nail will be a source of a loud sound. Another example of a predicted imminent loud sound can include a car trunk door detected in an open position, a user positioned close to the trunk door combined with the user making gestures that indicate the door is about to be closed.

Deep learning (e.g., neural network) models may be employed to learn complex patterns of a variety of factors to predict the potential loud sound. Increasing data may be collected over time during the course of the user's day to day activity to adjust the strength between factors and further train the AI models to more accurately predict potential loud sounds for a particular user. For example, an initial dataset may include common loud sound sources and/or sound reverberation elements, e.g., sounds having high reflectance characteristics, of common enclosed space, which are non-specific to a user. The datasets may be supplemented or replaced with loud sound sources that the user repeatedly experiences and/or sound reverberation elements of enclosed spaces that the user frequents. Behaviors of the user that impact sound volume may further be observed and built into a training dataset. For example, it may be learned that when the user holds a hammer and enters a workshop, and then swings the hammer, a loud sound is very likely imminent. The dataset become more refined as more patterns are discovered during a course of monitoring the user's activity. Predicted loud sound volumes associated with different combinations of factors may further become refined. In some implementations, as data regarding sound volumes are collected, appropriate arrangements of open and closed vent valves may be determined as appropriate for the predicted loud sounds.

A "user" of the hearable vent control system as applied in this description, refers to at least one person with a hearable device and image capture device of the hearable vent control system. The user, with the assistance of the vent control system, may experience hearing protection from loud sounds in the environment.

The present hearable vent control system addresses issues that can arise when using other types of hearing protection devices. For example, other sound control hearables may rely on the presence of a loud sound already occurring to then block the sound. These hearable devices require precise detection of sound characteristics, such as frequency, to successfully invert a waveform and thus cancel the sound. Thus, quick action by these other devices to block sudden sounds prior to the actual sound occurring, and then allowing later sounds may be difficult to achieve.

Other sound control hearables may also use detection the already occurring loud sound to close vents. In still other sound control hearables, general guesses are made about possible sounds based on a general location of the user (e.g. via global positioning system (GPS) data), or actions of the user. These other devices fail to estimate a loudness of a predicted sound by detecting various visual features in the environment. Thus, these other sound control devices can lack accuracy in controlling vent closures. For example, a user determined to be watching television may not accurately determine whether the sound from the television set will be loud, requiring vent closure, or soft (below a threshold volume) or even muted, which would not require vent closure. Similarly, generally determining a user is in an environment that can be loud, e.g., a construction site, can fail to account for times that the environment does not have loud sounds, such as during off work hours. Again, in such circumstances, these other devices may result in unnecessarily closing vents. These other sound control hearables fail to identify visual aspects in the current user environment, that predictably produce loud sounds and/or allow high reverberation of sounds, e.g., high reflectance characteristics, through real time image capture and analysis.

The present hearable vent control system circumvents such problems by reliably detecting visual visual sound factors present in the user environment, captured in real time in images of the environment. Such captured visual sound factors may be consistently known to result in the presence of a loud noise above a threshold volume. For example, a visual sound factor may include detection of an enclosed space, detected presence of reflective material on surface(s) of the space, and/or the distance between the user and the reflective surface (e.g., at least 19 yards between the user and the reflective surface), area or size of the enclosed space, sufficient to predictably result in a reverberation of sounds above a threshold volume.

The threshold volume may be predefined for a particular user sensitivity to sounds or particular frequency of sounds. In some cases, the threshold volume may be predefined as a known volume that is prone to be harmful to a population of persons. The threshold volume may include an actual measurable volume as well as a perceived sound volume by a typical user, such as the case with reverberation of sound. In other example, the images may capture a reoccurring object for the user, which is known to be a source of a loud sound above a threshold volume. In some implementations, more than one visual sound factor may be considered with or without situational factors from situational data, and the combination of sound factors is used to predict the potential loud sound above a threshold volume. The present hearable vent control system has additional benefits that will be apparent by this description.

FIG. 1 shows an example use case illustrative of the hearable vent control system 104 employed by a user 102 in an environment 100 to enable a hearable device 106 to close vents in anticipation of a potential loud noise predicted to satisfy a loudness threshold. An image capture device 108 of the vent control system 104 is worn by the user 102 to connect with a hearable device 106 of the vent control system 104, also worn by the user 102.

The type of hearable device 106 depicted in FIG. 1 shows a headphone type hearable with a pair of hearing units that cup over the respective ears of the user 102 and are couple to each other via a band. Other hearable devices may be earbuds worn at one or both ears of a user, one or a pair of hearing aids, etc. The pair of hearing units or earbuds can share data, such as to coordinate status, or direct control of the other unit/earbud, etc., via a wired connection and/or wireless connection. The hearable device may be inserted into the ear, implanted into the ear, worn over part of the head, such as a hat or band, etc. The hearable may also be a component of a wearable system including other devices, such as smart glasses, smart watch, etc.

The hearable device 106 includes one or more microphones (not shown), such as in one or both of the hearing unit and/or a microphone component attached to the hearable device 106. The microphones may be positioned to capture environmental noises by air passing through one or more passageways in the headphone units. The voice of the user may also be captured by the microphones or other components, such as a voice pick-up sensor or other voice detection technology.

The image capture device 108, may include smart glasses, other wearable device, or a component coupled to the hearable device 106, which takes images. Image may include a set of images in a video, burst, or sequence shot, a still photograph, or other image that includes visual features of the environment 100. The image capture device 108 may be forward facing, side facing, and/or rear facing relative to the direction the user is facing. In some implementations, the image capture device 108 may include a collection of cameras facing various directions relative to the user. Various type of cameras may be employed, such as a 360 degree cameras, a camera with wide angle lenses or ultra-wide lenses, etc.

The image capture device 108 captures images that include a variety of visual sound factors that add to prediction of a loud sound in the environment. Visual content in the images may be analyzed and recognized. A visual sound factor may include objects in the environment known to be sources of loud sounds. The vent control system may learn of a loud sound source from the vent control system previously detecting the object in prior images as having emitted a loud sound. The vent control system may also recognize the object from the images as a generally known and common source of loud sounds stored in a common source library. The vent control system may further recognize additional situational factors from the images or other sensors that indicate a potential loud sound above a threshold level is imminent. A combination of sound factors may be considered, such as by an AI model, to predict the potential loud sound above a threshold volume.

In the present example in FIG. 1, images captured by the image capture device 108 include an enclosed space 112, e.g., room, with a door 110. Additional situational factors may include user behavior. For example, the user 102 routinely swings 114 open and shut the door 110 (illustrated by a dotted arrow line), which may be particularly heavy and previously detected as a source of loud sounds when the door closes at a point of contact 116.

Location situational factors may also contribute to the analysis, such as recognition of the room 112 may add to identification of this particular door. For example, the room 112 may be recognized as a garage and stored data describes garage doors as a source of louder sounds than some other types of doors in other parts of a house. The object data is stored in a library of loud sound sources for the user.

Additional situational factors may be regarded to indicate that a potential loud sound is imminent. An estimated proximity of the loud sound source from the user may be determined by analysis of the image, and/or proximity sensors on the hearable device or image capture device. Sequential images, e.g., video may further capture that the user is approaching the loud sound source (door) with the user extending an arm in an action that suggests the user is about to open the door. Descriptive data describing this repetitive action may be stored for the loud sound source, including a description that this door swings shut after opened producing the loud sound.

In some implementations, the vent control system may further recognize visual sound factors in the images that include elements known to allow high reverberation sounds in the environment, such as high reflectance characteristics, e.g., wall materials including smooth concrete or cement, ceramic tile, marble, sealed granite, windows, metal, wood, heavy calm water, and the like. The reflective material can make the enclosed space prone to sound reverberation, thus elongating the sound and increasing the sound volume for the user. For example, at least one surface enclosing the space may include material that is hard, dense, flat and impenetrable, compared to dead sound rooms with little reverberation sound. In some cases, absorbent materials may also be detected and considered in combination with the reflective materials in the environment to collectively predict sound reverberation in the enclosed space.

In this manner, the vent control system may predict a potential loud sound and act to at least partially close vents of the hearable device before the sound occurs. Closure of vents may take place by actuating one or more valves position within a passageway of the vents, as described below in FIG. 5. In some implementations, recognition of visual sound factors by the vent control system 104 may be realized with or without the user 102 needing to recognize or even see the visual sound factor in the environment 100. The image capture device 108 picks up on visual sound factors sufficiently to detect the visual sound factor within a confidence threshold.

The vent control system may return the vent to a pre-sound position after the actual loud sound ceases. In some implementations, one or more external microphones may be positioned outside of the vents to detect the actual loud sound and signal the hearable device when the sound has stopped. In some implementations, the vent control system may use a predefined expiration time designated for the actual loud sound. For example, prediction of the potential loud sound based on detected sound factors may also include a predicting an expiration time for the potential loud sound, based on the sound factors. In still some implementations, a stored library of loud sounds may include a stored expiration time associated with the potential loud sound. When no actual loud sound is detected for a period of time and/or a predicted or stored expiration time has occurred, the vents may be reopened to the state that the vents were prior to predicting the loud sound. For example, one or more valves that were actuated due to the predicted loud sound may be returned to their prior positions.

Figure 2:
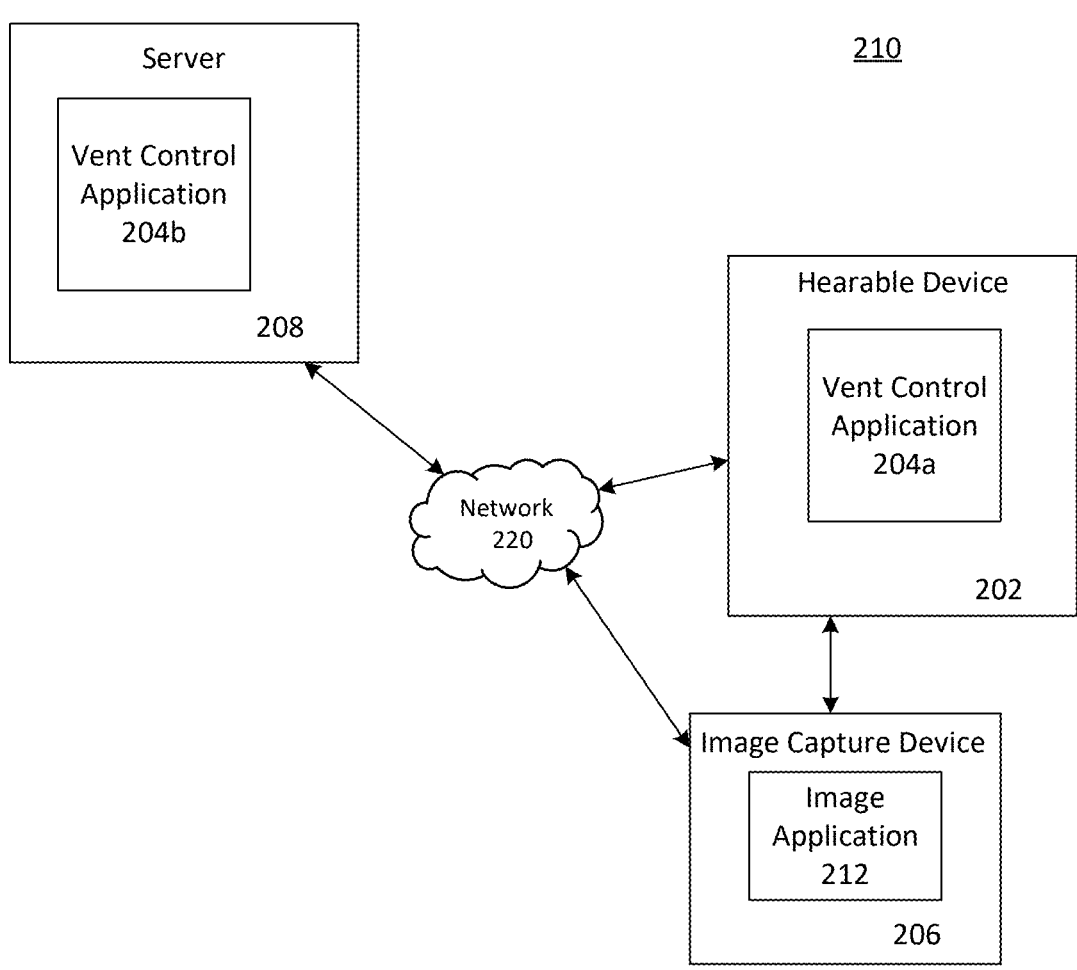
FIG. 2 is a block diagram of an example of components of an environment that includes the hearable vent control system, in accordance with some implementations.

FIG. 2 shows a block diagram of an example of some basic components of an environment 200 that includes the hearable vent control system 210. Components of the hearable vent control system 210 may include hearable device 202, image capture device 206 and/or server 208 (including one or more servers), which may be connected via network 220. Hearable device 202 and image capture device 206 may be wired or wirelessly directly connected to each other for communication via vent control application 204a with image application 212.

The hearable device 202 connects with the image capture device 206 via vent control application 204a and determines visual sound factors based, at least in part, on analysis of images from the image capture device 206. The image analysis may be performed by the vent control application 204a or server side vent control application 204b of the server 208, or a combination of steps may be performed by both user vent control application 204a or server vent control application 204c. For example, the vent control application 204a may extract visual loud sound factors from visual content captured in the images and send the visual loud sound factors to the server. The hearing application 204b of the server may search one or more libraries stored at the server or third party storage entity to locate the stored factors that correlate with the visual loud sound factors. Image recognition processes may also be offloaded to be performed by the server 208 or an external device, such as a smart phone in communication with other components of the hearable vent control system, e.g., Bluetooth, WiFi, etc.

The network 220 may include a local area network, a wide area network, a wireless network, an Intranet, the Internet, a private network, a public network, a switched network, cellular, wired connections, or any other communication network, such as for example Cloud networks, suitable for connecting the components. Network 220 may include a short-range connection between the user hearable 202 device and server 208, such as Bluetooth Low Energy (BLE) connection. Other connections are possible such as wide band and ultra-wide band.

Other configurations of the communication system 200 may be employed and are considered within the scope of this disclosure. Various designs and configurations of a hearable device may be used. For example, in some implementations, a server need not be employed, other computing devices may be used such as a smartphone of the user, etc. Various other computing devices may include vent control applications to perform various of the vent control steps, as described in flow charts in FIGS. 6-7.

Figure 3:
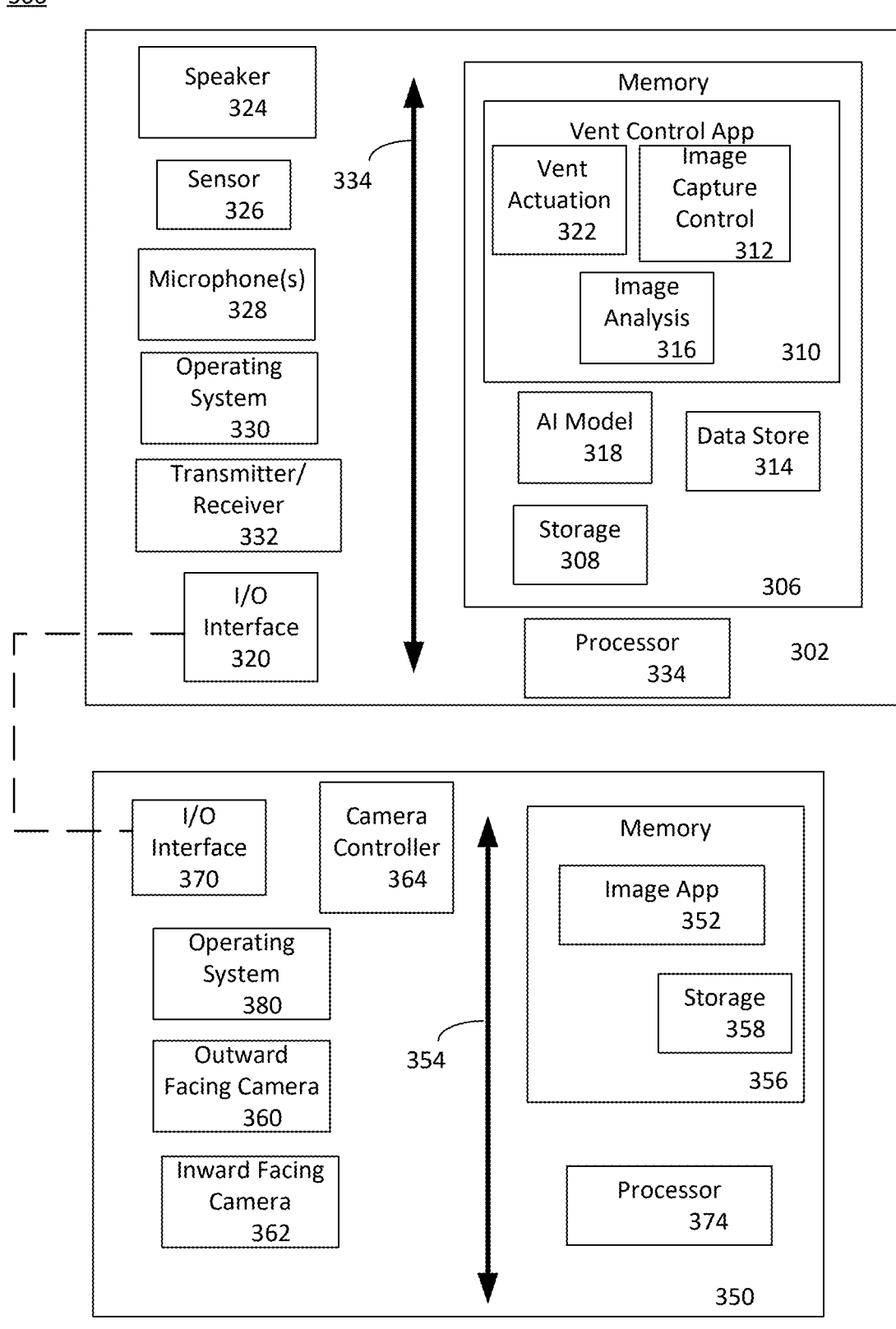
FIG. 3 is a block diagram of components of the hearable vent control system usable to implement in the processes of FIGS. 7-8, in accordance with some implementations.

FIG. 3 shows components of the hearable vent control system 300 by way of a block diagram, including a hearable device 302 and an image capture device 350. The a hearable device 302 and an image capture device 350 are worn, held, or otherwise on the user.

The hearable device 302 includes hardware and/or software to perform operations to manipulate vent openings in response to predicted loud environmental sounds, such as operations described below with regard to FIGS. 6-7. For example, the hearable device 302 includes one or more processor(s) 334 and logic encoded in one or more non-transitory media for execution by processor(s) 334 and when executed it is operable to perform the vent control operations described herein. At least some of the hardware and/or software may also be in other parts of the vent control system 300, such as image capture device 350 and/or server (e.g., 208 in FIG. 2).

The vent control application 310 includes various modules to perform functions of the vent control process. Modules may include image capture control 312, image analysis 316, and vent actuation module 322.

Image capture control module 312 may direct the image capture device 350, via I/O interface 320, to commence and/or stop capturing images. The image capture control module 312 may further transmit controls for particular camera parameters to the image capture device 350, for example, to specify focus, resolution, zoom levels, such as to focus on particular objects or sound amplification elements in the environment. The image capture control module 312 may further direct certain cameras of the image capture device 350 to turn on and capture images or turn off. For example, the image capture control module 312 may direct forward and side cameras to take photographs or record video and turn off a rear facing camera. In some implementations, the image capture control module 312 may direct control of an inward facing camera 362 in addition to the outward facing camera 360. Other combinations of cameras to be turned on/off are possible.

In some implementations, directing of certain cameras may be in response to the vent control system detecting events such as the user entering a particular environment, such as a room, area, or building, in response to a time of day, in response to an activity of the user, etc. In still some implementations, the user vent control application 310 need not control the image capture device, for example, the user may manually control the capturing of images.

Image analysis module 316 performs assessment of the images received via I/O interface 320 of the hearable device 302 and sent from the I/O interface 370 of the image capture device 350. The image analysis module 316 may extract visual sound factors from the images. For example, the image analysis module may perform object recognition algorithms to identify objects in the images. Various known techniques may be employed to analyze images.

In some implementations, the image analysis module 316 may further analyze images of the user captured by an inward facing camera (sensors) 362. For example, eye movement of the user may be assessed to determine an object that the user intends to interact with and that may be a potential loud sound source. For example, the example shown in FIG. 1 may use an inward facing camera to determine the user attention is on the door, which the user intends to open. The direction of the user eyes may be correlated with objects in the environment and detected in images captured by the outward facing camera(s).

The identifier module 304 may maintain lists of visual sound factors and may also include data associated with the sound factors, such as expected sound volumes. More than one visual sound factor may be grouped as related in which the group of visual sound factors, if present in the environment may predictively lead to a particular volume of sound. In some implementations, individual visual sound factors in a group may be associated with different weights that impact the prediction of a sound volume. When less than the group of visual sound factors are detected, the potential sound volume may be expected to be less. A lower potential sound volume may be less than a threshold volume that fails to trigger vent control. In some implementations, a lower sound volume may trigger modified vent control in which some valves may be closed and others left open to accommodate the sound volume. In some embodiments, the identifier module 316 accesses a personal library or general library of visual sound factors. The identifier module 304 may access, edit, and/or create the personal library from prior experiences with loud sounds by the user, from instructions provided by the user (e.g., the user asks to save particular visual sound factors), etc.

The identifier module 304 may also access, edit, and/or create a general library of visual sound factors that are generally or commonly known. The general library may include objects that typically emit loud sounds and/or places that often accentuate sound volumes, etc. At times, the vent control system may initially rely on a general library, which is updated with visual sound factors personal to the user. For example, data may be changed, added or removed with information gained by experiences of the user, such as reoccurring loud sounds to which the user is routinely or repeatedly exposed. The general library may also be updated to create a personal library with the use of user input to select loud sounds that the user wants protection from hearing.

The identifying module may further determine a volume of potential loud sounds and assess if such sounds are predicted to satisfy a volume threshold.

In some implementations, some or all of the identifying steps to recognize visual sound factors and predict sound volumes may be off loaded to a server. For example, the libraries may be stored remotely at a server and the server may match visual sound factors and/or other factors that may impact sound volume that meets loudness threshold.

AI model 318, which may include one or more AI models, may also be employed to perform the identifying steps described above with regards to identifier module 304 and/or image analysis module 316.

Predictions that a potential loud sound would satisfy the threshold volume may be performed by the one or more AI models 318, for example at the hearable device 302, server (such as 208 in FIG. 2) or other external device. In some implementations of AI models, the detected visual sound factors identified by identifier module 304 may be inputted into the AI model for an output of the prediction of the volume of the potential loud sound (including a perceived volume by the user). In some implementations, different AI models may be employed depending on the visual sound factors detected in the images.

For example, an enclosed space AI model may predict a reverberation effect on sound volume for a user hearing a loud sound due. The AI model may receive as input reverberance elements detected in images of the enclosed space, e.g., highly sound reflective materials, highly sound absorbent materials, size of the enclosure, etc. A common source AI model may predict a loud sound source, e.g., object, in the environment and predict that at least one visual sound factor is present in the images and that visual sound factor satisfies the threshold volume. The AI models may combine various types visual and situational factors to make the prediction. For example, a room with three walls being highly reflective but a fourth wall having sound absorbing material, may require consideration of the characteristics of all four walls to predict a reverberation effect on a particular predicted sound.

Other AI models may also be used, such as a factor extraction AI model that uses the images as input and outputs a prediction of visual sound factors detected in the visual content of the images. AI models may be trained by computing devices, such as server 208 in FIG. 2 or other external device that receives captured and/or extracted and/or processed data across network (such as 220 in FIG. 2) from the vent control system components or external devices, e.g., smartphone of the user. AI model training is described in more detail below with regards to FIG. 8.

The vent actuation module 322 controls the closing and opening of vents by actuating valves in vent passageways, according to the prediction of an impending potential loud sound and the potential volume compared to a threshold volume. Various configurations vents and valves are described below with regards to FIG. 5.

In some implementations, the I/O interface 320 may also receive input from the user, such as user commands to operate aspects of the vent control system, e.g., turn on/off the vent control system, adjust particular vent openings and valves, etc. User input may be made by various input mechanisms, such as a microphone detecting user instructions from the user. Sensors 326 may include a voice pick-up sensor that identifies jaw vibrations, a motion sensor (or more specifically, a proximity sensor) that detects gestures or a tap from the user that indicates that the user wants to change an open or close state of one or more vents.

In some implementations, one hearing unit may communicate through I/O interface 320 to coordinate with another hearing unit in the pair of units of the hearable device. The I/O interface 320 may also be enabled for wireless communication, such as via Bluetooth, Bluetooth Low Energy (BLE), radio frequency identification (RFID), etc. Wireless communication by the hearable device may connect with other computing devices, such as a smart device of the user, e.g., smartphone, smart watch, etc. In some implementations, hearable device 300 may also include software that enables communications of I/O interface 320 over a network such as HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like.

Other common hearable device components may be included, such as an integrated circuit (IC) and a computer chip-embedded amplifier to receive sound input and convert electrical signals from the microphones to digital signals. The IC may include a digital-to-analog converter (DAC) or analog to digital converter (ADC). A transmitter and receiver 332 may process, transmit and/or receive environmental sound signals. A power source often includes disposable and/or rechargeable batteries. In some implementations, a global positioning system (GPS) receiver may be included to detect a location of the user that can be used as a situational factor in predicting potential loud sounds.

The hearable device 302 typically includes other familiar computer components such as a processor 334, and memory storage devices, such as a memory 306. A bus 334 may interconnect hearable device components.

Memory 306 may include solid state memory in the form of NAND flash memory and storage media 308. The computer device may include a microSD card for storage and/or may also interface with cloud storage server(s). Memory 306 and storage media 308 are examples of tangible non-transitory computer readable media for storage of data, audio files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, cloud storage, and the like. A data store 314 may be employed to store various on-board data, such as stored libraries of visual sound factors, captured images, etc. In some implementations, the data store 314 may store images for analysis such as by image analysis module 316. At some point, the images may be removed from data store 314, such as emptied on a regularly timed basis, deleted after analysis is complete, or as requested by the user.

Hearable device 302 further includes an operating system 330 to control and manage the hardware and software of the computer device 302. Any operating system 330, e.g., mobile OS, that supports the hearable vent control methods may be employed, e.g., IOS, Android, Windows, MacOS, Chrome, Linux, etc.

In some implementations, the image capture device 350 is a smart device, such as a wearable camera device, that includes computing components, some of which may be similar to the components described above for the hearable device 302 and adapted for the image capture device 350, such as a memory 356 (similar to memory 306), a processor 374 (similar to processor 334), operating system 380 (similar to operating system 330), storage 358 (similar to storage 308), I/O interface 370 (similar to I/O interface 320), and bus 354 (similar to bus 334). In some implementations, the image capture device may also include a display screen and function to display different types of visual content to the user.

Image application 352 may process the images for receipt by the hearable device 302. Depending on the recognition algorithms being employed, the images may be enhanced using techniques to improve recognition. Camera controller 364 directs capture of images by the outward facing camera and/or inward facing camera. The camera controller 364 may further focus parameters of the image capture device 350 on particular objects in the environment, such as according to directions received by the hearable device 302.

Outward facing camera 360 captures the images, e.g., video frames and/or still photographs, within a field of view in the environment. More than one outward facing sensor may be included. The outward facing camera 360 may include various types of sensors depending on the image recognition technique used, such as traditional cameras (with different lenses such as wide angle lens), 360 degree cameras, thermal sensors, depth sensors, near-infra red sensors, light detection and ranging sensors (LiDAR), time-of-flight cameras, etc. In some implementations, specialized lenses may be employed for particular recognition technique. In some implementations, the image capture device 350 may also include an inward facing camera 362 to capture images of the face of the user, such as the eyes of the user.

The components of the communication system 300 are merely illustrative and not intended to limit the scope of the claims. One of ordinary skill in the art would recognize other variations, modifications, and alternatives.

Figure 4:
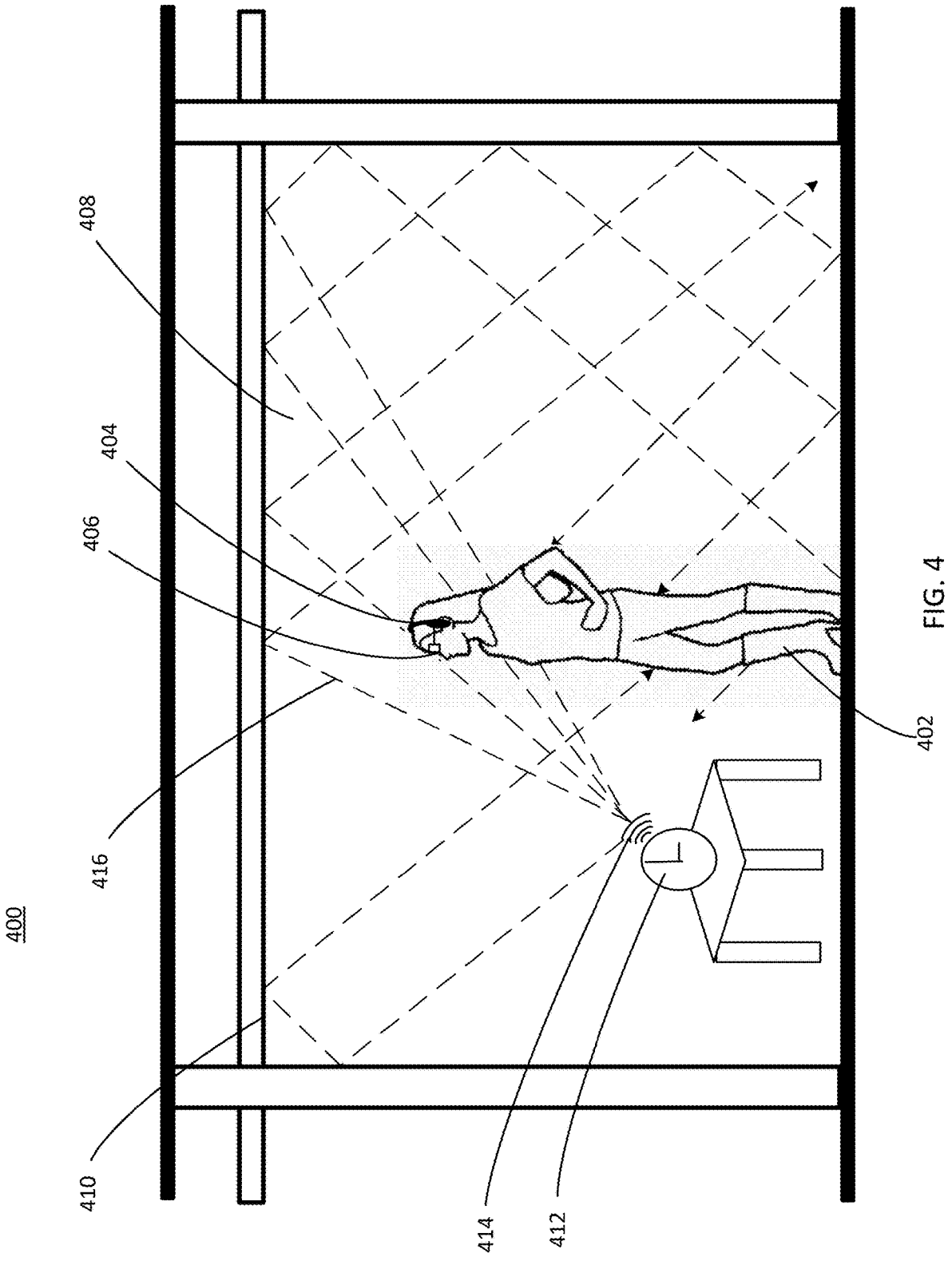
FIG. 4 is a conceptual diagram illustrating an example of reverberation in a room detected by the hearable vent control system, in accordance with some implementations.

FIG. 4 illustrates an environment 400 of a user 402 in an enclosed space 408 (e.g., a room) that includes wall material 410 that fails to damper sound. The user 402 wears a hearable device 404 (e.g., headphones) and image capture device 406 (e.g., smart glasses with at least one camera) that include components of the vent control system. The vent control system may protect user's 402 hearing by closing vents of the hearable device prior to an alarm 412 emits an actual loud sound 414, which is predicted to reverberate to a high degree, as illustrated by dotted rays 416. As the sound signals hit the reflective wall material 410 in the enclosed space, at least a significant amount of the sound signals bounce off of the wall, rather than being absorbed. Should the room also include non-reflective wall material, the vent control system may consider the overall effect of both highly reflective materials and absorbent materials. As a result of predicted high reverberance in the example of FIG. 4, and should the hearable device vents remain open, the user 402 would likely perceive that the volume of the loud sound is loud. The sound volume detected by the user 402 would be louder than the same sound would be in a same room without the reflective wall material 410. Instead, the cent control system would be used to predict the impending loud sound and close vents of the hearable device, accordingly, thus saving the user from exposure to the loud sound.

Figure 5:
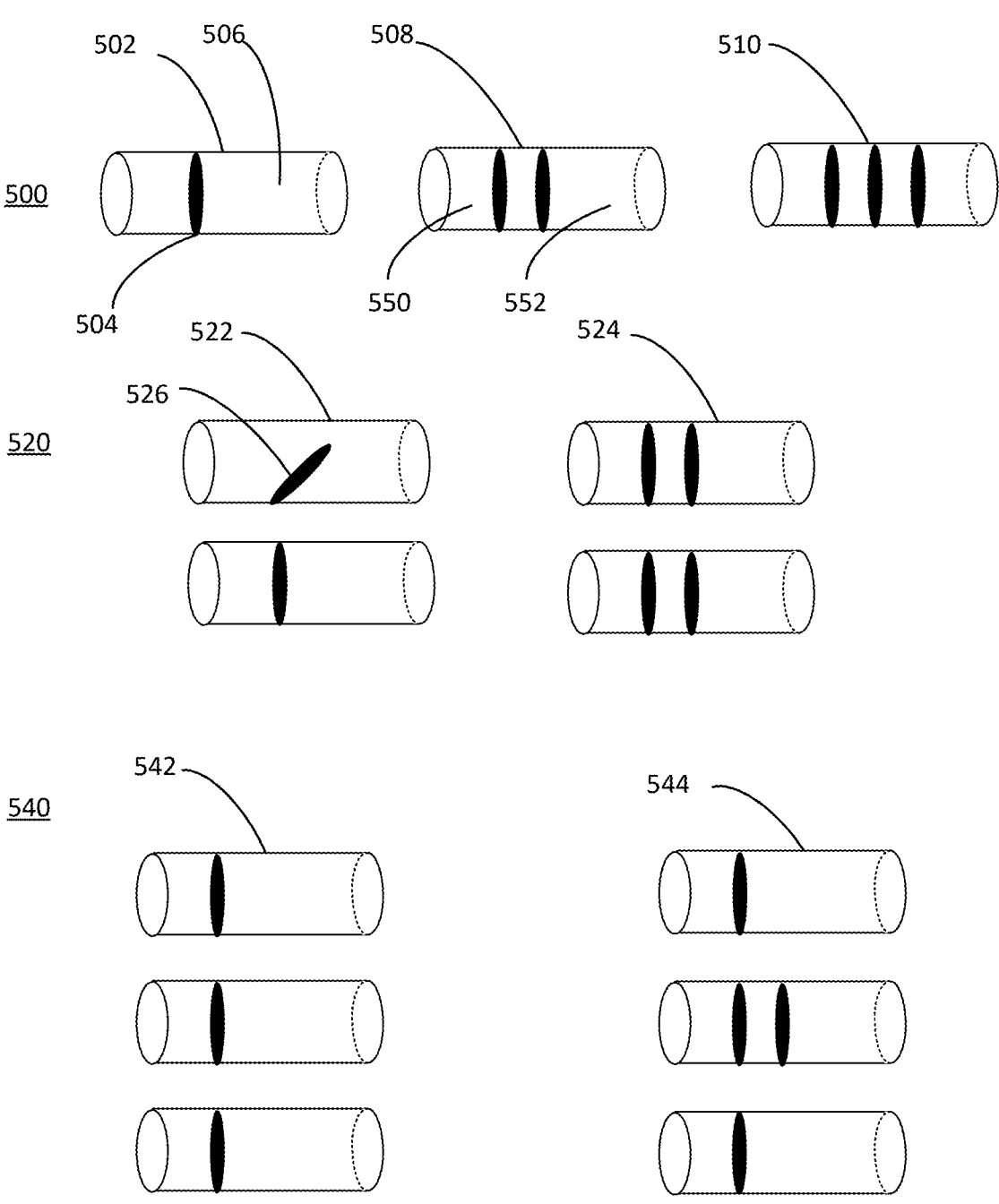
FIG. 5 is an example of various vent configurations in response to predicted sound volumes by the hearable vent control system, in accordance with some implementations.

FIG. 5 shows an example of a various vent systems having different vent and valve configurations. In some implementations, the vent system may have multiple vents per ear (e.g., in each hearing unit of the hearable device). and arrangements of vents that may be controlled according to the hearable vent control system. At times, some vents may be closed while other vents may remain open to help focus sound for the user, in a manner comparable to use of polarized light to help focus light for a person to see better.

In some implementations, multiple level loudness thresholds may be employed where some sounds may be louder than other sounds. Closure of various vents and valves may be appropriate to the predicted loudness, as well as other considerations, such as the direction of the potential loud sound. For example, where a potential loud sound is predicted to have a volume that satisfies a first level loudness threshold, only 1 of three vents may be closed, whereas a predicted louder sound satisfying a second level loudness threshold may require two vents or all three vents to be closed. Similarly, at times less than all of the valves may be closed in a vent. In still some instances, a potential loud sound may be projected to come from a certain direction relative to the user position in the environment. In such cases, only vents in hearing units closer to the direction of the potential loud sound may be closed while the vents in the other hearing unit farther from the potential loud sound may remain open.

In a single vent system 500, an individual vent may include one or more valves 504 in a passageway 506, e.g., channel. For example, vent 502 includes a single valve, vent 508 includes two sequential valves in series, and vent 510 includes three series of valves.

In a double parallel vent arrangement 520, a single valve may be inserted in the passageway 506 of two vents 522 or two vents may have double valves in series 524. In some vent arrangements, a three vent system 540 is used, in which a vent is dedicated to an X-axis, another vent is for a Y-axis, and the third vent is for a Z-axis. A single valve may be positioned along passageways 506 of three valves 542. In other three vent parallel arrangements 544 various patterns of valves may be provided, such as a single valve, double valve and single valve in parallel vents.

Except for partially closed valve 526, the other valves shown in FIG. 5, are in a closed position in which air is restricted or prevented from passing between a front chamber 550 for an entrance portion of the vent prior to the valve positions and back chamber 552 of a vent passageway 506 for an exit portion of the vent after the valve positions. In some implementations, the valve, as shown by example valve 526, may be partially closed to provide a small opening between a front chamber 550 and a back chamber 552 of the vent passageway 506. Partial closing of a vent may also include closing of less than all of the valves positioned in a vent passageway, such that at least one valve remains partially opened or fully opened. Partial closure is effective to reduce airflow and the loudness of the sound as heard by the user. In an open position (not shown), air may have free passage (e.g., unrestricted) between the front chamber 550 and back chamber 552.

Figure 6:
FIG. 6 is a flow diagram of an example method to control open and close vent states of a hearable devices, in accordance with some implementations.
Figure 6:
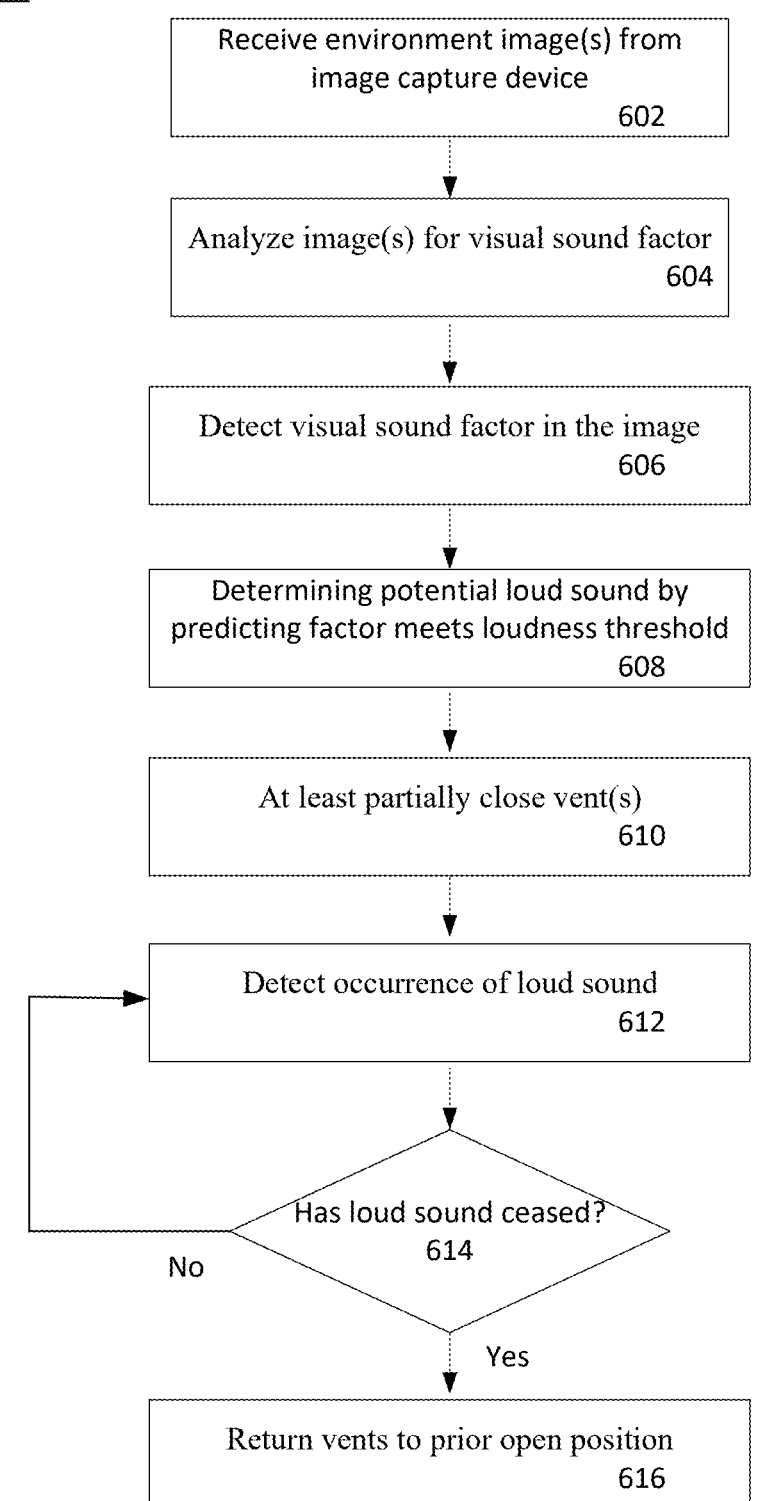

FIG. 6 shows a flow chart of a hearable vent control process 800 in which open and closed states of vents in a hearable device are controlled. Detecting of visual features in an environment facilitates projecting that a potential loud sound will occur in the environment of a user. Such predictions of potential loud sounds are used to determine actuation of valves in the vents. The vent control process 600 is performed by the hearable vent control system, for example system 300 shown in FIG. 3 and in a particular example, performed by hearable device 302 in FIG. 3.

Images are captured by the image capture device, such as 350 in FIG. 3, worn or held by a user as the user goes about day to day tasks. The images may be captured on a regularly scheduled basis, such as every 5, 10, or 30 seconds. In some implementations, image capture and/or transfer to the hearable device may take place in response to an event trigger, such as the user entering a particular environment or the user doing an activity known to include loud sounds. The user may also request through user input, that images be captured and/or analyzed.

In block 602, the captured image(s) of an environment of a user are received from the image capture device. In block 604, the received images are analyzed by screening visual content for visual features that are considered visual sound factors. The visual features that may be extracted from the images using any of a variety of known image recognition and analysis algorithms, such a object recognition, proximity assessment, etc. The image recognition technique used depends on visual sound factors of interest. For example, when the user enters a room, the analysis technique may target walls of the room to search for any of a plurality of materials that may highly reflect sound above a reflectance threshold. In block 606, visual sound factors are detected from the image analysis.

In block 608, it is predicted whether the potential loud sound would meet a loudness threshold. At least one visual sound factor is matched with stored visual sound factors and stored associated loudness of the sound. The match may need to satisfy a confidence threshold value for the prediction to be successful.

Since the prediction happens before the loud sound actually occurs and/or is detected, the vent control system interprets previously stored data to make a prediction of sound volume on the fly. When the potential loud sound is imminent, the vent control process quickly functions to predict the potential loud sound volume and acts to appropriately close vents prior to the actual loud sound affecting the user's hearing.

In block 610, the vent control system controls the mechanical movement of vent components, such as valves at an entrance and/or in passageways of the vents. One or more of the valves of one or more vents may be actuated to at least partially close in a manner appropriate to the predicted loud sound volume. When a vent is partially closed, some air and loud may pass through to the hearing components but a reduced amount of the sound will enter. To partially close a vent, the vent control system may close less than all of the valves in a vent and/or move a valve to a position that does not seal a vent passageway but rather moves the valve part way to merely hinder passage of sound and air.

In block 612, as the actual loud sound occurs (as predicted) in the environment, the sound is captured, such as by external microphones of the hearable device. At the point of the actual loud sound occurring, the appropriate measure of closing vents has occurred and the user hearing is protected.

The actual loud sound may be monitored to determine when the actual loud sound ceases and it is safe for the hearable device to return to a prior open state. In decision block 614, it may be detected whether the environmental loud sound is still occurring. Where the actual loud sound persists, the vent control process returns back to block 612 to continue detecting a monitoring the sound. When the actual loud sound is no longer in the user environment including if the sound drops below, the process continues to block 616 to return the vents to a prior open state. At times, the actual loud sound may cease due to the user moving away from the source of the loud sound (or vice versa where the loud sound source moves away from the user) or the sound source may stop emitting the sound.

In some cases, the actual loud sound has stopped for a predefined pause period of time and in response, the vent(s)

are returned to prior open positions. If, after a brief stoppage of the actual loud sound, the loud sound returns prior to the expiration of the pause period of time, the vent closure is maintained. Other triggers to return the vent open position may include receiving user input requesting the return of the vent open state.

In some cases, more than one visual sound factor may be found in an environment, and collectively be found to create a potential loud sound sufficient to meet the loudness threshold. In some cases, the loud sound may result from more than one loud sound source and the sum of the sounds is projected to hit the loudness threshold. In some implementations, various weights may be associated with various visual sound factors, where one visual sound factor may be predicted to have more of an impact on the loudness of the potential loud sound. In some implementations, the above described image analysis and/or prediction may be performed by one or more AI models, as described below in FIG. 7

Figure 7:
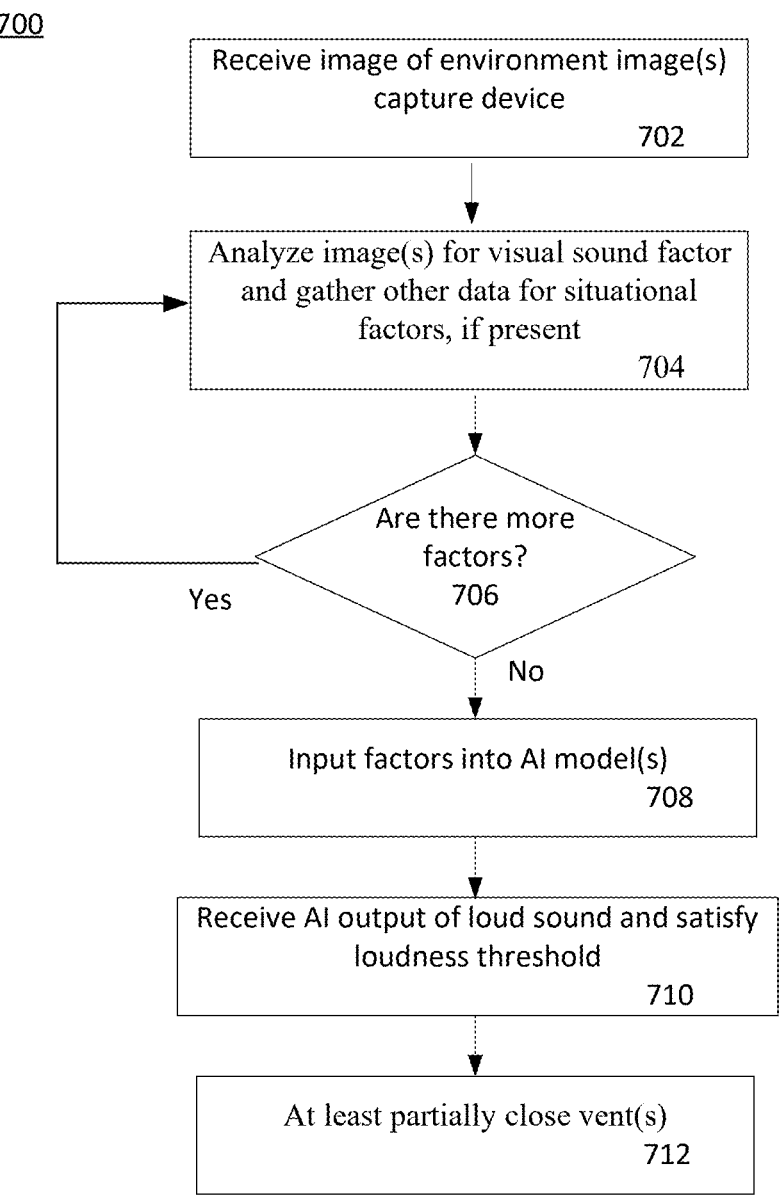
FIG. 7 is a flow diagram of various example multi-factor vent control method using AI, in accordance with some implementations.

FIG. 7 is a flow chart of a multi-factor vent control process that uses AI model(s). The multi-factor process 700 is performed by hearable vent control system, for example system 300 shown in FIG. 3 and in a particular example, performed by hearable device 302 in FIG. 3 and can be also performed jointly with server 208 in FIG. 2.

The steps of receiving images in block 702 may be similar or the same as step described above for FIG. 6 in block 602. In block 704, images are analyzed to detect visual factors that indicate an impending loud sound. In some cases, a plurality of visual factors may be extracted from one or multiple images that collectively create a story that a loud sound will likely occur and the volume of the predicted sound will be above a threshold requiring protection of the hearing of the user. For example, a hammer lying on a table may not in itself indicate an imminent loud sound. But the hammer combined with a nail and a user holding and even swinging the hammer creates a picture of the loud sound about to occur. Moreover, additional data indicating situational factors may be gathered that enhances the prediction. For example, GPS data may show the user in a repair store where a hammer is often used against metal that makes a loud sound. Such location data may be stored as a situational factor to enhance the prediction of the loud sound and sound volume.

In decision block 706, it is determined whether there are more sound factors, visual factors and/or situational factors, to be identified. If there are additional visual sound factors to analyze or situational data to be gathered, the process returns to block 704 to analyze the images and/or gather situational data for the next sound factor.

In some implementations, situational sound factors may be planted into the environment to test a potential for a loud sound and predict volume. For example, in an enclosed space environment, the vent control system may emit a brief sample sound, such as a beep or chirp. The system may measure the received sample sound in the environment to test for reflectance characteristics of the space. For example, a reverberance time of the sample sound may be evaluated.

Where there are no additional sound factors to consider, the process continues to block 708. In block 708, the identified sound factors are inputted into one or more AI models. In some implementations, more than one AI model is employed for different visual sound factors. For example, an enclosed space AI model may receive input that is relevant to identifying potential reverberance of sound due to sound reflective elements in the environment. A common source AI model may receive input that is relevant to identifying a sound source, e.g., object, of potential loud sounds.

In block 710 predictions outputted by the AI model(s) are received to be used in determining vent closure. In some implementations, the AI model further outputs the configuration of vent closure that is predicted to be needed to optimize hearing protection from loud sounds without needlessly over closing the hearable device from inert sounds.

In block 712, various vents are at least partially closed according to the output of the AI model(s). Vent closure may be performed in a same or similar manner as described above in FIG. 6, blocks 610-616.

Figure 8:
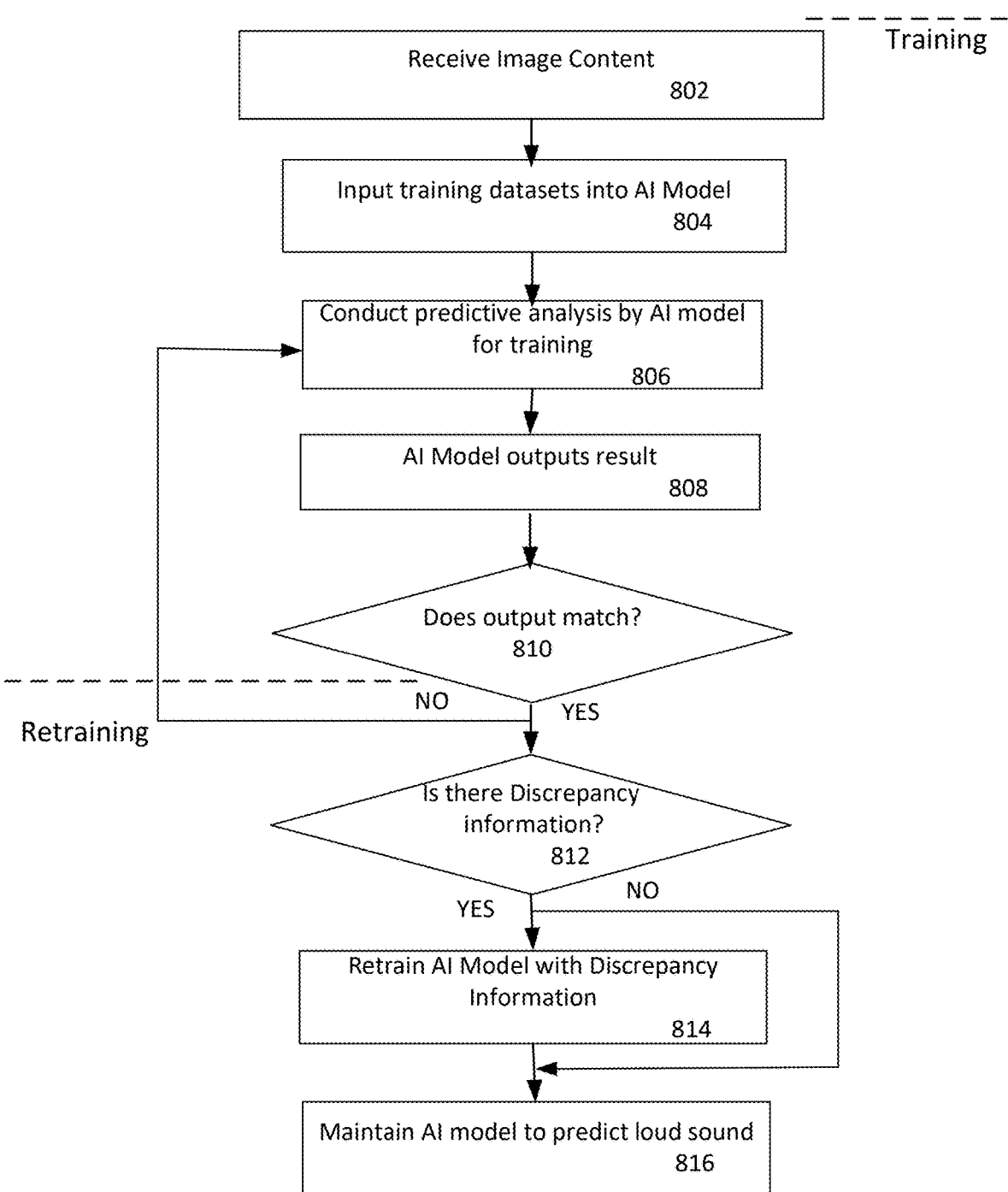
FIG. 8 is a flow diagram of an example method for training an artificial intelligence (AI) model for use in predicting loud sounds, in accordance with some implementations.

In some implementations, machine learning is employed to enable self-learning by analyzing training data sets and improve performance over time. FIG. 8 is a flow chart of an example training process for AI models that may used in the processes described above in FIGS. 6 and 7. In some implementations, the techniques to train the AI model may employ supervised classification algorithms, such as logistic regression algorithms. In some implementations, unsupervised or semi-supervised techniques may be employed.

In block 802, sample image content is received or otherwise accessed for assessment/training purposes. In block 804, training datasets including the sample image content, or visual sound factors are inputted into the AI model. The training datasets may also include other situational factors, such as user behavior, location, etc., that may impact a prediction of a potential loud sound and/or a volume of the potential loud sound that satisfies a loudness threshold.

In block 806, the AI model conducts predictive analysis using the training dataset. The training of the AI model may include determining patterns in previous image content, visual sound factors, combinations of visual factors and situational factors, etc., that lead to positive predictive results. Based on the analysis, the AI model outputs a result of the analysis, in block 808.

In decision block 810, the output result is compared with the training dataset inputted into the AI model and predetermined expected output result, to determine whether the output result matches. It is determined whether a threshold of success is achieved by the output result. The threshold of success may specify that some value equal to or less than 100% accuracy (such as 80%-90% success rate) is acceptable output results to be used. In some implementations, the output result may be used to dynamically change a list of visual sound factors and/or stored associated loud sound volume that is expected.

If it is decided in decision block 810 that the output results match the training datasets to meet the threshold of success, the process continues. If there is a finding that the output results fail to match according to the threshold of success, the AI model is retrained by returning to block 806 and conducting predictive analysis again until the output result matches the training dataset. If a match is not achieved after a threshold number of tries, the analysis algorithm and/or training dataset may be assessed to find a solution to the failures.

In decision block 812, it is determined whether there is discrepancy information from prior AI model output results, in which the output of particular prompts was found to fail a threshold level of success in predicting a potential loud sound that meets a threshold volume. Discrepancy information may include feedback from an external support resource, quality control studies, user survey data, etc. The discrepancy information may be used for retraining in block

814. After discrepancy information retraining is complete, the process proceeds to decision block 816 described below.

If no discrepancy information is received, the process skips the discrepancy information retraining and continues to decision block 816 to maintain the AI model for future use in outputting predictions on potential loud sounds for vent closures. In some implementations, the AI model may be trained at a computer processing system independent from the vent control system. The vent control system may receive or otherwise access the trained AI model upon receiving images to be analyzed or upon detection of visual sound factors in such images.

Some or all of the training/retraining process 800, or any other processes described herein, or variations and/or combinations of those processes, may be performed under the control of one or more computer systems configured with executable instructions and/or other data, and may be implemented as executable instructions executing collectively on one or more processors. In some implementations, training/retraining process 800 may include additional steps.

The methods of FIGS. 6-8 described herein can be performed via software, hardware, and combinations thereof. The process may be carried out in software, such as one or more steps of the process carried out by the hearable vent control system. Although the description has been described with respect to particular implementations thereof, these particular implementations are merely illustrative, and not restrictive.

Computer programs are employed and when executed by one or more processors, are operable to perform various tasks of methods including the vent control processes, as described above. The computer programs may also be referred to as programs, software, software applications or code, may also contain instructions that, when executed, perform one or more methods, such as those described herein. The computer program may be tangibly embodied in an information carrier such as computer or machine readable medium, for example, the memory, storage device or memory on processor. A machine readable medium is any computer program product, apparatus or device used to provide machine instructions or data to a programmable processor.

Any suitable programming language can be used to implement the routines of particular embodiments including IOS, Objective C, Swift, Java, Cotlin, C, C++, C#, JavaScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method vent control of a hearable device, the method performed, comprising:

receiving from an image capture device of a user, at least one image of an environment of the user;

analyzing the at least one image to detect at least one visual sound factor indicative of a potential loud sound;

based, at least in part, on detecting the at least one visual sound factor, predicting that the potential loud sound in the environment satisfies a threshold volume; and in response, at least in part, to predicting the potential loud sound satisfies the threshold volume, at least partially closing one or more vents of the hearable device.

2. The computer-implemented method of claim 1, wherein predicting the at least one visual sound factor satisfies the threshold volume, includes:

inputting the at least one image into a common sound artificial intelligence (AI) model trained on loud sound datasets that include common visual features associated with loud sounds including the potential loud sound; and receiving an output from the common sound AI model including that the at least one visual sound factor is present and the at least one visual sound factor is predicted to satisfy the threshold volume to identify the potential loud sound.

3. The computer-implemented method of claim 1, inputting the at least one image into an enclosed space AI model trained on sound reflective elements; and receiving an output from the enclosed space AI model including a prediction that the at least one visual sound factor satisfies the threshold volume to identify a potential loud sound, the prediction being based on the enclosed space AI model performing predictive steps of:

determining that the environment of the user is an enclosed space; and detecting of a high reflectance characteristic of the environment sufficient to cause the potential loud sound to satisfy the threshold volume.

4. The computer-implemented method of claim 3, wherein the at least partially closing of the one or more vents is further in response to:

emitting a sample sound into the environment;

detecting the sample sound from the environment; and analyzing the detected sample sound to determine a high reflectance characteristic of the environment.

5. The computer-implemented method of claim 1, wherein the at least one visual sound factor includes a sound source, and wherein predicting that the at least one visual sound factor satisfies the threshold volume includes:

identifying the sound source by the analyzing of the at least one image;

determining an estimate proximity of a sound source from the user; and determining the estimate proximity of the sound source meets a threshold loudness distance.

6. The computer-implemented method of claim 1, wherein the at least partially closing of the one or more vents includes:

determining an estimate sound volume of the potential loud sound;

based, at least in part, on the estimate sound volume:

allowing at least a first vent of the one or more vents to remain open to allow unobstructed air passage; and closing at least a second vent of the one or more vents to prevent air passage.

7. The computer-implemented method of claim 1, wherein the at least partially closing of the one or more vents of the hearable device includes:

determining an estimate sound volume of the potential loud sound; and based, at least in part, on the estimate sound volume:

partially closing at least one vent of the one or more vents, to allow a reduced passage of air.

8. The computer-implemented method of claim 1, wherein analyzing the at least one image to determine the at least one visual sound factor, includes:

identifying at least one object in the at least one image; and matching the object with a stored object in a library of common sources of the loud sounds.

9. A hearable vent control system, the system comprising:

an image capture device of a user to capture at least one image of an environment of the user, the image capture device comprising an interface to transmit the at least one image to a hearable device of the user; and the hearable device comprising:

one or more processors; and logic encoded in one or more non-transitory media for execution by the one or more processors and when executed operable to perform operations comprising:

receiving from an image capture device of a user, at least one image of the environment of the user;

analyzing the at least one image to detect at least one visual sound factor indicative of a potential loud sound;

based, at least in part, on detecting the at least one visual sound factor, predicting that the potential loud sound in the environment satisfies a threshold volume; and in response, at least in part, to predicting the potential loud sound satisfies the threshold volume, at least partially closing one or more vents of the hearable device.

10. The hearable vent control system of claim 9, wherein the image capture device includes a wearable device having one or more cameras to capture the at least one image of the environment, wherein the operations further comprise:

identifying at least one object in the at least one image; and matching the object with a stored object in a library of common sources of the loud sounds.

11. The hearable vent control system of claim 9, further comprising:

a common sound AI model trained on loud sound datasets that include common visual features associated with loud sounds including the potential loud sound, to output a prediction that the at least one visual sound factor satisfies the threshold volume to identify a potential loud sound, the prediction being based on the common sound AI model performing predictive steps of:

identifying at least one object in the at least one image; and matching the object with a stored object in a library of common sources of the loud sounds.

12. The hearable vent control system of claim 9, further comprising:

an enclosed space AI model trained on reflect sound reflective elements:

to output a prediction that the at least one visual sound factor satisfies the threshold volume to identify a potential loud sound, the prediction being based on the enclosed space AI model performing predictive steps of:

determining that the environment of the user is an enclosed space;

performing the analyzing of the at least one image; and detecting of a high reflectance characteristic of the environment sufficient to cause the potential loud sound to satisfy the threshold volume.

13. The hearable vent control system of claim 12, wherein the predictive steps of the enclosed space AI model, further comprise:

detecting a sample sound emitted into the environment from the hearable vent control system; and analyzing the detected sample sound to determine a high reflectance characteristic of the environment.

14. The hearable vent control system of claim 9, wherein the at least one visual sound factor includes a sound source, and wherein predicting that the at least one visual sound factor satisfies the threshold volume includes:

identifying the sound source by the analyzing of the at least one image;

determining an estimate proximity of a sound source from the user; and determining the estimate proximity of the sound source meets a threshold loudness distance.

15. A non-transitory computer-readable storage medium carrying program instructions thereon for vent control of a hearable device, the instructions when executed by one or more processors cause the one or more processors to perform operations comprising:

receiving from an image capture device of a user, at least one image of an environment of the user;

analyzing the at least one image to detect at least one visual sound factor indicative of a potential loud sound;

based, at least in part, on detecting the at least one visual sound factor, predicting that the potential loud sound in the environment satisfies a threshold volume; and in response, at least in part, to predicting the potential loud sound satisfies the threshold volume, at least partially closing one or more vents of the hearable device.

16. The non-transitory computer-readable storage medium of claim 15, wherein predicting the at least one visual sound factor satisfies the threshold volume, includes:

inputting the at least one image into a common sound artificial intelligence (AI) model trained on loud sound datasets that include common visual features associated with loud sounds including the potential loud sound; and receiving an output from the common sound AI model including that the at least one visual sound factor is present and the at least one visual sound factor is predicted to satisfy the threshold volume to identify the potential loud sound.

17. The non-transitory computer-readable storage medium of claim 15, wherein inputting the at least one image into an enclosed space AI model trained on sound reflective elements; and receiving an output from the enclosed space AI model including a prediction that the at least one visual sound factor satisfies the threshold volume to identify a potential loud sound, the prediction being based on the enclosed space AI model performing predictive steps of:

determining that an environment of the user is an enclosed space; and detecting of a high reflectance characteristic of the environment sufficient to cause the potential loud sound to satisfy the threshold volume.

18. The non-transitory computer-readable storage medium of claim 15, wherein the at least one visual sound factor includes a sound source, and wherein predicting that the at least one visual sound factor satisfies the threshold volume includes:

identifying the sound source by the analyzing of the at least one image;

determining an estimate proximity of a sound source from the user; and determining the estimate proximity of the sound source meets a threshold loudness distance.

19. The non-transitory computer-readable storage medium of claim 15, wherein the at least partially closing of the one or more vents includes:

determining an estimate sound level of the potential loud sound;

based, at least in part, on the estimate sound level:

allowing at least a first vent of the one or more vents to remain open to allow unobstructed air passage; and closing at least a second vent of the one or more vents to prevent air passage.

20. The non-transitory computer-readable storage medium of claim 15, wherein the at least partially closing of the one or more vents of the hearable device includes:

determining an estimate sound level of the potential loud sound; and based, at least in part, on the estimate sound level:

partially closing at least one vent of the one or more vents, to allow a reduced passage of air.

* * * * *